June 24, 1924.  
J. A. MEANY  
BUTTER CUTTER  
Filed Jan. 8, 1923  
1,498,881  
2 Sheets-Sheet 1
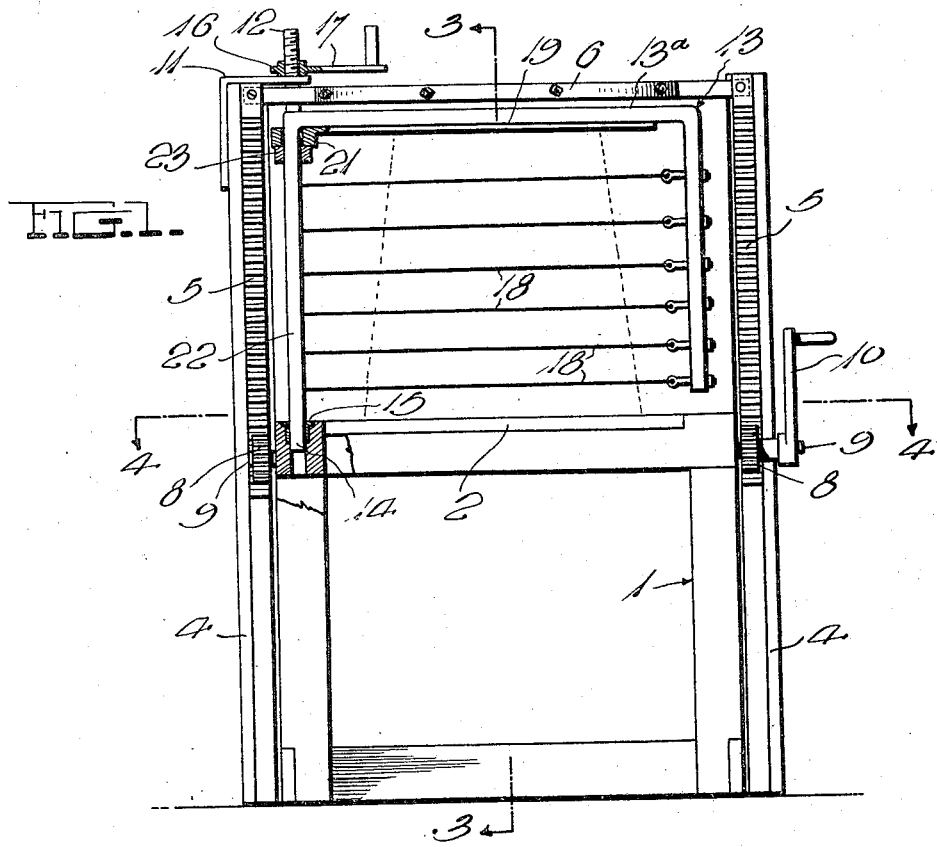
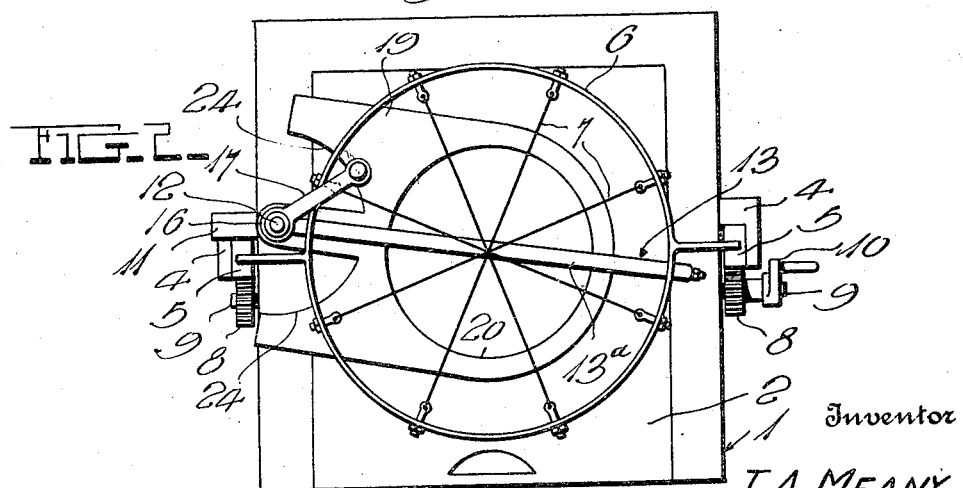
Witness  
H. Woodard
Inventor  
J. A. MEANY  
By H. R. Willson & Co.  
Attorneys

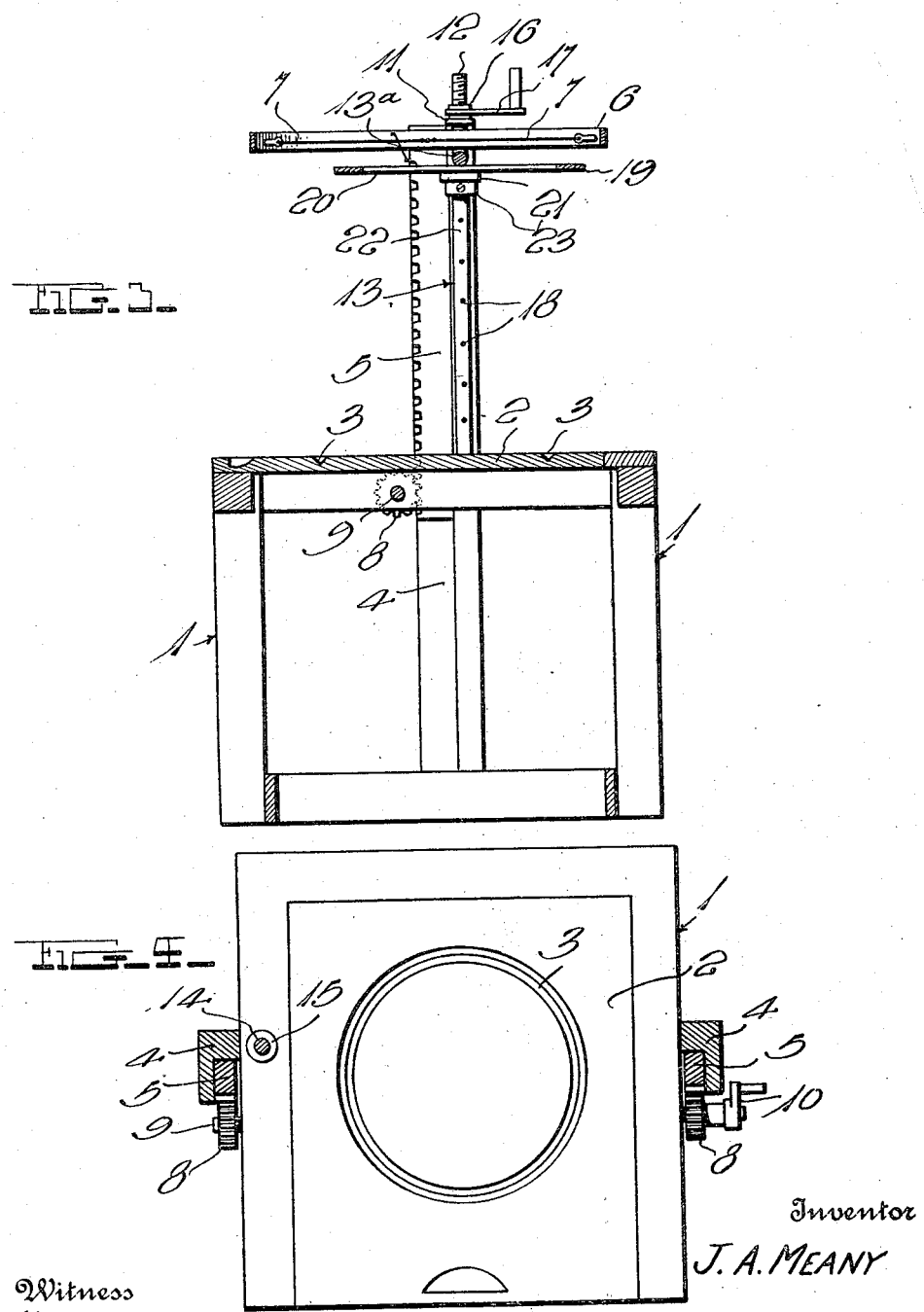

Patented June 24, 1924.

1,498,881

UNITED STATES PATENT OFFICE.

JAMES A. MEANY, OF MONONGAHELA, PENNSYLVANIA.

BUTTER CUTTER.

Application filed January 8, 1923. Serial No. 611,356.

*To all whom it may concern:*

Be it known that I, JAMES A. MEANY, a citizen of the United States, residing at Monongahela city, in the county of Washington and State of Pennsylvania, have invented certain new and useful Improvements in Butter Cutters; and I do declare the following to be a full, clear, and exact description of the invention, such as will enable others skilled in the art to which it appertains to make and use the same.

My invention relates to improvements in devices for cutting up blocks of butter into small pieces, by the use of a pair of cutters, one movable horizontally and the other vertically.

One object of the invention is to provide a machine of the class set forth which is operable to cut the block of butter into pieces of substantially uniform weight, regardless of the fact that the block may be of frusto-conical shape, as dumped from an ordinary butter tub.

A further object of the invention is to provide a butter cutter having a novel form of plate for engaging the upper end of the block of butter and holding it in proper position while the horizontal cutting operation is being effected.

A still further object is to make novel provision for vertically adjusting the cutting means employed for cutting the block of butter horizontally in vertically spaced planes, the plate above referred to being adjustable bodily with this cutting means for guiding its operation.

With the foregoing and minor objects in view, the invention resides in the novel subject matter hereinafter described and claimed, the description being supplemented by the accompanying drawings.

Figure 1 is a front elevation partly in section.

Figure 2 is a top plan view.

Figure 3 is a vertical sectional view as indicated by line 3—3 of Fig. 1.

Figure 4 is a horizontal section on line 4—4 of Fig. 1.

In the drawings above briefly described, the numeral 1 designates an appropriate framework supporting a removable pallet or table top 2 upon which a block of butter is adapted to be supported. I prefer to form the top 2 with an annular groove 3 to receive the edge of a butter tub, whereby the block of butter may be dumped from this tub onto the top at a predetermined position.

At the opposite sides of the table, I provide rigid upright guide tracks 4 with which rack bars 5 are slidably engaged, the upper ends of these rack bars being suitably connected to a hoop 6 which carries a plurality of butter cutting wires 7 which radiate from the center of the hoop. The rack bars 5 mesh with a pair of pinions 8 on a horizontal shaft 9 rotatably mounted in suitable bearings with which the frame 1 is provided, a crank 10 or other preferred means being employed for rotating this shaft, whereby the hoop 6 may be raised or lowered in the operation of the machine, it being obvious that when said hoop is lowered around a block of butter upon the pallet 2, this block will be cut into a plurality of segments of equal size.

The upper end of one of the guides 4 is provided with a bearing 11 which slidably and rotatably receives a trunnion 12 on the upper end of a vertical cutter carrying frame 13, the lower end of this frame being provided with another trunnion 14 which is slidably and rotatably received in a bearing 15 carried by the frame 1 or any other preferred part of the table structure. In the present showing, the trunnion 12 is threaded and a nut 16 is engaged with the threads, said nut engaging the upper surface of the bearing 11 whereby the frame 13 may be vertically adjusted. The nut 16 is preferably provided with an operating handle 17.

Extending horizontally across the frame 13, are vertically spaced butter cutting wires 18 which cut the block of butter horizontally when the frame 13 is swung upon its pivotal axis. In view of the fact that the blocks of butter to be cut by the machine increase gradually in size toward their lower ends, it will be seen that if the wires 18 were vertically spaced to uniform extent, the pieces of butter cut at the bottom of the block would be of greater weight than those at the relatively small upper end. In fact, the pieces of butter at any particular elevation would not weigh the same as those in the next adjacent tiers. Hence, as it is my intention to have the pieces of butter into which the block is cut, of substantially uniform weight, I decrease the distances between the wires 18 from the upper end of the series to the lower end thereof, proportionately with the increase in the diameter of the blocks of butter to be cut. By this arrangement, the desired results are obtained and while in most instances I prefer to have the blocks of butter cut into pieces weighing one pound, it will be understood that pieces of greater or less weight could be cut by a proper arrangement of cutting wires.

In the present showing, the frame 13 is of arched form to straddle the block of butter which is shown in dotted lines in Fig. 1. For the purpose of horizontally guiding this frame and at the same time holding the block of butter properly centered, I provide a horizontal plate 19 to engage the upper end of the block of butter, said plate being preferably provided with an opening 20 to receive the latter. The top bar 13ª of the frame 13 slides across the plate 19 when said frame is operated to cause cutting of the butter by means of the wires 18. I prefer to provide the plate 19 with a bearing 21 which receives one of the side bars 22 of the frame 13 and rests upon a collar 23. By this arrangement, the plate 19 is pivoted coaxially with the frame 13 so that the latter may swing in the desired manner without moving the plate. It will also be seen that both the plate 19 and the frame 13 may be horizontally swung out of the path of the hoop 6, permitting the latter to be lowered when desired. I have shown the plate 19 provided with a pair of notches 24 in its pivoted end, these notches being adapted to receive the adjacent guides 4 when the plate is swung in one direction or the other.

By employing the construction shown or a substantial equivalent thereof, a butter cutter is provided which will be highly efficient and in every way desirable. As excellent results are obtainable from the general construction shown, such construction is preferably followed, but it is to be understood that within the scope of the invention as claimed, numerous minor changes may be made.

I claim:
1. A butter cutter comprising a table to support a block of butter, a horizontal hoop above said table and means slidably mounting said hoop for vertical movement, said hoop having butter cutters, a vertical frame pivoted on a vertical axis over said table and having additional butter cutters, and a plate pivoted above said table for horizontal swinging, said plate having an opening to receive the upper end of the block of butter; said vertical frame and said plate being horizontally movable to positions out of the path of said hoop.

2. A butter cutter comprising a table to support a block of butter, a horizontal hoop above said table and means slidably mounting said hoop for vertical movement, said hoop having butter cutters, a vertical frame over the table having additional cutters, a horizontal plate pivoted on said frame and having an opening to receive the upper end of the block of butter, and means mounting said vertical frame for horizontal swinging co-axially with said plate.

3. A butter cutter comprising a table to support a block of butter, a support rising therefrom and having a bearing, said table being provided with a bearing vertically alined with the first named bearing, a vertical frame having cutters and provided with upper and lower trunnions received in said bearings, and a nut threaded on the upper trunnion and engaging the upper bearing to vertically adjust said frame.

4. A butter cutter comprising a table, a gage plate to rest on a block of butter supported by said table, and a horizontally movable butter cutter having a top bar slidable over said gage plate.

5. A structure as specified in claim 4; said cutter and said gage plate being co-axially pivoted.

In testimony whereof I have hereunto affixed my signature.

JAMES A. MEANY.